United States Patent [19]
Landau

[11] 3,900,324
[45] Aug. 19, 1975

[54] TREATMENT OF SYNTHETIC POLYESTER FILM PRODUCTS

[75] Inventor: Raphael Landau, Woodford Green, England

[73] Assignee: Ozalid Company, Ltd., Loughton, England

[22] Filed: June 25, 1972

[21] Appl. No.: 283,667

[52] U.S. Cl. .................. 96/87 R; 96/75; 96/91 R
[51] Int. Cl. ............................................... B44d 1/40
[58] Field of Search .......... 117/138.8 F, 36.8, 47 R, 117/47 A; 8/4, 41 C, 44, 45, 92; 96/75, 91 R

[56] References Cited
UNITED STATES PATENTS
| | | | |
|---|---|---|---|
| 3,298,834 | 1/1967 | Eldred et al. | 96/91 R |
| 3,301,679 | 1/1967 | Halperin et al. | 96/75 |
| 3,650,750 | 3/1972 | Iwata et al. | 96/75 |
| 3,689,302 | 9/1972 | Kubo et al. | 117/36.8 |

FOREIGN PATENTS OR APPLICATIONS
1,175,419   12/1969   United Kingdom

*Primary Examiner*—Thomas J. Herbert, Jr.
*Assistant Examiner*—Bruce H. Hess
*Attorney, Agent, or Firm*—Cushman, Darby & Cushman

[57] ABSTRACT

A process for sensitising or dyeing a film of polyethylene terephthalate which involves applying to the film a liquid medium containing ingredients of a one-component diazotype material or a dyestuff and also a halogenated acetic acid, a halogenated propionic acid or a fully halogenated derivative of acetaldehyde and heating to effect evaporation of the medium.

17 Claims, No Drawings

TREATMENT OF SYNTHETIC POLYESTER FILM PRODUCTS

Films of commercially available polyester resins, such as a polyethylene terephthalate material sold under the Registered Trade Marks MELINEX and MYLAR, have chemical and physical properties, in particular dimensional stability, which make them extremely suitable as base materials for diazotype copying materials or, when dyed, as light filters.

Films of polyester resin, however, have a very poor adhesion to an applied coating of light-sensitive material or containing a dyestuff. Such coatings have a tendency to peel or flake off the film, particularly when the coated film is flexed.

Various pre-treatments have been proposed to overcome this difficulty, including application to the film of an intermediate adherent polymeric material, treatment with an organic acid containing toothing agents in solution before application of the final coating, corona discharge and the application of the coating at elevated temperatures. In all cases the object of the treatment has been to increase the adhesion of the coating to the base film.

The object of the present invention is to eliminate the need for the pretreatment of the film before application of a coating of two-component diazotype material or dyestuff and to provide a process whereby constituents of the coating may be diffused beneath and remain at least in part beneath the surface layer of the polyester film and whereby the aforementioned tendency of the coating to separate from the film will be largely or completely eliminated.

The invention accordingly provides a process of sensitising or dyeing a film of polyester resin without pre-treatment of the film, which consists in applying to the surface of the film a solution or dispersion, in a liquid medium which evaporates upon heating to a temperature not exceeding 150°C, of a diazonium compound and a coupler, or a dyestuff, said solution or dispersion containing a compound selected from the group consisting of halogenated acetic acids, halogenated propionic acids and fully halogenated derivatives of acetaldehyde, in an amount sufficient to cause penetration into and deposition in the film of the diazonium compound and the coupler, or the dyestuff, and thereafter heating the film to effect evaporation of the medium.

The acetic or propionic acid may be a mono-, di- or tri- halogen substituted acid and the substituent may be chlorine, bromine, iodine or fluorine.

In the case of chlorinated acetic acids the extent of penetration into and swelling of "MELINEX" film is a maximum with trichloroacetic acid and a minimum with monochloroacetic acid. Trichloroacetic acid, however, is not very suitable for diazotype materials because it tends to give a yellowish background and it is accordingly preferred to use, of these acids, dichloroacetic acid.

The halogenated derivative of acetaldehyde may be chloral, chloral hydrate, bromal, bromal hydrate, fluoral, fluoral hydrate or mixtures of said compounds.

In all cases the penetration effect is enhanced by the heat utilized to evaporate the solvent.

By treatment of the film in this manner the materials contained in the coating solution are caused to penetrate the film and, on evaporation of the solvent, are deposited therein. The material so deposited keys to the film any residual material remaining on the surface of the film.

The chloro, fluoro and bromo substituted acids all have a similar effect.

In practice, the concentration of halogenated acid or of halogenated derivative of acetaldehyde in the coating solution is normally from 5% to 35% by weight, although higher concentrations, for example up to 50%, may be used.

In the case of a two-component diazotype material it is, of course, necessary to prevent premature coupling of the diazonium compound and the coupler. The halogenated acetic or propionic acid present in the solution or dispersion cannot always be relied upon as a coupling inhibitor, possibly because all of it is used up in attacking the polyester film. It is accordingly desirable also to include in the solution or dispersion another acid, preferably sulphuric acid or tartaric acid, or a mixture of these acids, to ensure prevention of premature coupling. The presence of sulphuric acid also enhances penetration of the polyester film by the halogenated acid. Such inhibitor is necessary when the solution or dispersion contains a halogenated derivative of acetaldehyde.

In the case of sulphuric acid, the concentration should be kept below 0.4% by weight, otherwise it remains on the surface of the polyester film as a wet layer. Tartaric acid is best used at a concentration of up to 3% by weight.

The process according to the invention has the advantage of providing a saving in cost since the polyester film can be sensitised or dyed by a single coating operation only. In the case of a diazotype material, the diazonium compounds used are, generally speaking, compounds requiring a relatively long exposure to light for decomposition. Such diazonium compounds have smaller molecules, whereas faster acting diazonium compounds have larger molecules and penetrate the polyester film less readily.

A wide range of diazonium salts and couplers may be used. When the solution or dispersion contains a halogenated acid the preferred diazonium salts are di- or tri-chloroacetates which may be prepared by treating an aqueous solution of a diazonium chloride with a solution in methyl ethyl ketone of di- or trichloroacetic acid. For example, the diazonium salt may be one or more of the following:

4-(N,N,dimethyl amino) benzene diazonium di- or tri-chloroacetate 4-(N,N,benzyl methyl amino) benzene diazonium di- or tri-chloroacetate 4-(N,N,diethyl amino) benzene diazonium di- or tri-chloroacetate 4-morpholino benzene diazonium di- or tri-chloroacetate N-hydroxyl (N ethylamino) benzene diazonium di- or tri-haloacetate Diphenylamine 4-diazonium di- or tri-haloacetate 4-(N,N,diethoxyamino) benzene di- or tri-haloacetate 3-chloro 4-(N diethylamino) benzene diazonium di- or tri-haloacetate 4-(N,N,diethylamino) benzene diazonium chloride.

Suitable couplers are:

resorcinol 4,6,dichlororesorcinol methyl esters of the resorcylic acids

22',-44', tetra hydroxy diphenyl

In a preferred embodiment of the invention the halogenated acetic acid is dichloroacetic acid, the diazonium salt is 4 N,N,diethylamino benzene dichloroacetate and the coupler is 4,6,dichlororesorcinol and pre-coupling is prevented by a mixture of sulphuric and tartaric acids.

The polyester film may be coated by well-known methods and dried at approximately 120°C. Freshly sensitised material is susceptible to finger marking but within a few hours develops considerable resistance to this defect.

After exposure to actinic radiation the sensitised film is developed by treatment with ammonia.

The finished print is water and alcohol resistant.

The following are Examples of coating solutions for use in sensitising "MELINEX" film.

1.

| | |
|---|---|
| Isobutyl alcohol | 50.0 ml |
| Methyl alcohol | 20.0 ml |
| Dichloroacetic acid | 16.5 ml |
| Sulphuric acid 20% V/V | 1.5 ml |
| Tartaric acid | 1.5 gm |
| 4,6,dichlororesorcinol | 4.0 gms |
| 4-N,N,diethyl amino benzene diazonium dichloroacetate | 3.5 gms |

2.

| | |
|---|---|
| Methyl ethyl ketone | 75.0 ml |
| Difluoroacetic acid | 12.0 ml |
| Tartaric acid | 1.5 gms |
| Resorcinol | 3.5 gms |
| 4-N,N,dimethyl amino benzene diazonium fluoroacetate | 3.7 gms |

3.

| | |
|---|---|
| Iso butyl alcohol | 35.0 ml |
| Methyl alcohol | 35.0 ml |
| Tri-bromo acetic acid | 15.0 ml |
| Sulphuric acid 20% V/V | 2.0 ml |
| Tartaric acid | 1.0 gm |
| 2,2'-4,4'tetra-hydroxy diphenyl | 3.4 gms |
| 4-N,N,diethoxy amino benzene tribromoacetate | 4.0 gms |

4.

| | |
|---|---|
| Methyl ethyl ketone | 60.0 ml |
| Chlorobenzene | 15.0 ml |
| Chloral hydrate | 20.0 gms |
| Sulphuric acid 20% V/V | 1.0 ml |
| Resorcinol | 2.5 gms |
| 4-N,N,diethylamino benzene diazonium chloride | 3.0 gms |

5. 6. 7.

These are of the composition specified in Example 4 but with the chloral hydrate respectively replaced by an equal amount of bromal hydrate, fluoral hydrate and a mixture of bromal hydrate and fluoral hydrate.

The following is an example of a solution for use in dyeing "MELINEX" film:

8.

| | |
|---|---|
| Methyl ethyl ketone | 15.0 ml |
| Dichloroacetic acid | 5.0 ml |
| Spirit Blue (obtainable from Messrs. Hopkins & Williams Ltd.) or Hexovar Blue (obtainable from L. J. Pointing & Sons) | 0.2 g |

The "MELINEX" film was treated with the above solution and then dried for 35 seconds at 125°C.

After treatment, samples of film were exposed to methyl ethyl ketone and to methanol. In both cases, after prolonged exposure at room temperature, the samples dyed with Spirit Blue and Hexovar Blue were found to be substantially fast to both solvents, whereas dye applied to the film from a solution devoid of dichloroacetic acid would be removed by these solvents.

What I claim as my invention and desire to secure by Letters Patent is:

1. A process for sensitising to actinic radiation a film consisting of polyester resin without pretreatment of the film, which consists in applying to the surface of the film a solution or dispersion, in a liquid organic solvent medium which evaporates upon heating to a temperature not exceeding 150°C., of a diazonium compound and a coupler, said solution or dispersion consisting essentially of said solvent and a halogenated compound selected from the group consisting of halogenated acetic acids, halogenated propionic acids fully halogenated acetaldehyde hydrate and fully halogenated acetaldehyde, in an amount sufficient to cause penetration into and deposition in the film of the diazonium compound and the coupler, and thereafter heating the film to effect evaporation of the medium, an acid also being present when said halogenated compound is said fully halogenated acetaldehyde.

2. A process as claimed in claim 1, in which the liquid medium contains 5% – 35% by weight of halogenated acid.

3. A process as claimed in claim 1, in which the liquid medium contains 5% – 35% by weight of fully halogenated acetaldehyde.

4. A process according to claim 1, wherein the solution or dispersion also contains another acid to prevent premature coupling of the diazonium compound and the coupler.

5. A process according to claim 4, wherein the other acid is selected from the group consisting of sulphuric acid, tartaric acid and mixtures of sulphuric acid and tartaric acid.

6. A process according to claim 5, wherein sulfuric acid is present and the concentration of sulphuric acid in the solution or dispersion is below 0.4% by weight.

7. A process according to claim 5, wherein tartaric acid is present and the concentration of tartaric acid in the solution or dispersion is up to 3% by weight.

8. A two component diazotype material when made by the process claimed in claim 1.

9. A process according to claim 1, wherein the halogenated acid is a chlorinated acetic acid.

10. A process according to claim 1, wherein the halogenated acid is dichloroacetic acid.

11. A process according to claim 1, wherein the halogenated acid is difluoroacetic acid.

12. A process according to claim 1, wherein the halogenated acid is tribromacetic acid.

13. A process according to claim 1, wherein the halogenated compound is chloral hydrate.

14. A process according to claim 1, wherein the concentration of halogenated acid or fully halogenated acetaldehyde in the coating solution is from 5% to 50% by weight.

15. A process according to claim 1 wherein the halogenated compound is chloral, chloral hydrate, bromal, bromal hydrate, fluoral or fluoral hydrate.

16. A process according to claim 1 wherein the liquid is selected from the group consisting of isobutyl alcohol, methyl alcohol, methyl ethyl ketone and chlorobenzene.

17. A process according to claim 1 wherein there is applied a solution of the diazonium compound, coupler and halogenated compound in an organic solvent.

* * * * *